United States Patent

[11] 3,608,877

[72] Inventors Edward H. Dehn
Oil City;
Fernand J. Dewez, Jr., Monroeville, both of Pa.
[21] Appl. No. 88,030
[22] Filed Nov. 9, 1970
[23] Division of Ser. No. 711,261, Mar. 7, 1968.
[45] Patented Sept. 28, 1971
[73] Assignee United States Steel Corporation

[54] APPARATUS FOR TREATING CIRCULAR SAW BLADES
4 Claims, 4 Drawing Figs.
[52] U.S. Cl. .................................................... 266/4 E, 75/147
[51] Int. Cl. ...................................................... C21d 1/66

[50] Field of Search ........................................... 148/147, 149, 152; 266/4 E, 4 R, 4 S

[56] References Cited
UNITED STATES PATENTS
2,816,848  12/1957  Maxon .......................... 148/147

*Primary Examiner*—Gerald A. Dost
*Attorney*—Walter P. Wood

ABSTRACT: An apparatus for hardening the teeth and tooth roots of a saw blade used for cutting hot steel shapes. Blade rotates, while its teeth and roots are heated to the austenitizing temperature and quenched by a stationary induction-heating unit and a stationary quenching device. Shield applied to blade to prevent reheating and softening of portion first heated as it reenters heating unit. The hardening treatment forestalls failure through fatigue cracking at the roots.

PATENTED SEP 28 1971

INVENTORS.
EDWARD H. DEHN
FERNAND J. DEWEZ, JR.

BY *Walter P. Wood*

ATTORNEY

INVENTORS.
EDWARD H. DEHN
FERNAND J. DEWEZ, JR.

BY  Walter P. Wood

ATTORNEY

APPARATUS FOR TREATING CIRCULAR SAW BLADES

This application is a division of our copending U.S. Pat. application Ser. No. 711,261, filed Mar. 7, 1968.

This invention relates to an improved apparatus for treating circular saw blades to forestall fatigue failure.

Although be as invention is not thus limited, our apparatus is particularly useful for treating saw blades used for cutting hot steel shapes, such as slabs, billets or structural sections. This type of blade is a relatively thin steel disk, which may be as large as 72 inches in diameter and five-eighth inch in thickness. Teeth are machined into the blade around its circumference. The most common shape of tooth is a symmetrical V. The cutting action results from continuous high-speed rotation of the blade with the tooth tips starting the cut and pushing their way through the work. Hence the tips are subject to stresses which may cause wear and plastic flow.

Usually the entire blade is treated by heating it above the austenitizing temperature, quenching it in liquid, and tempering it at a temperature which produces a hardness of 25 to 40 Rockwell C. The blade must be brought to this hardness so that it can be machined to its final configuration, and to afford maximum toughness and ductility. Subsequently the tooth tips are subjected to a localized hardening operation to produce a hardness greater than 45 Rockwell C and usually 50 to 60 Rockwell C. Conventionally this localized hardening is attained by again heating the tips above the austenitizing temperature and quenching them in air or liquid. The hardened portion commonly extends about one-fourth to one-half the height of the tooth. When teeth wear to an extent that they do not cut efficiently, they are reground to restore their original contour and rehardened. A blade may be thus reconditioned several times, but ultimately may fail through formation of fatigue cracks at the roots of the teeth.

An object of our invention is to provide an improved apparatus for heat-treating circular saw blades to harden them and at the same time increase their resistance to fatigue.

A further object is to provide an improved apparatus for accomplishing the foregoing object by use of which we extend the hardened zone to include the roots of the teeth, but avoid developing stresses likely to cause the blade to warp.

A more specific object is to provide a heat-treating apparatus by use of which we heat the teeth and their roots to the austenitizing temperature a small section at a time by induction and quench them while slowly rotating the blade, but confine the region softened by reentry of hardened teeth into the induction-heating unit to one side of one tooth.

Figure 1:
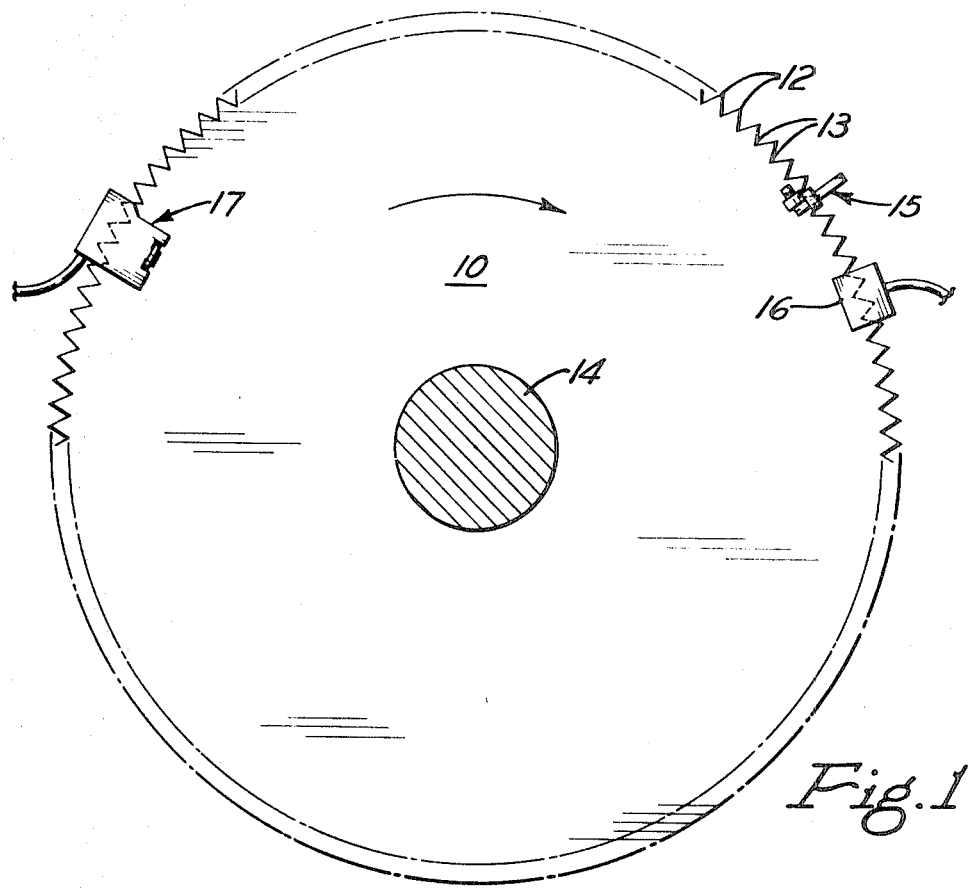
FIG. 1 is a diagrammatic side elevational view of a circular saw blade undergoing treatment by use of the apparatus of our invention.

FIG. 1 shows a conventional circular saw blade 10 of the type used for cutting hot steel shapes. The blade has a plurality of symmetrical V-shaped teeth 12 extending around its circumference and roots 13 between teeth. We mount the blade on an arbor 14 to enable it to be rotated at a peripheral speed of about 5 to 50 inches per minute while undergoing treatment in accordance with our invention. At any convenient location we place a stationary induction-heating unit 15 (hereinafter described) over the teeth and tooth roots. A short distance beyond the unit we place a quenching head 16 over the edge of the blade. The distance between the heating unit and quenching head should not exceed about one-fifteenth the blade circumference (about a 25° arc). The quenching head is a hollow metal shell with internal openings through which we may apply a liquid or air quench or a combination of both to the edge of the blade. After we heat and quench a major portion of the blade circumference, we attach a water-cooled shield 17 (hereinafter described) to the blade over the teeth immediately following one of the roots which we have already hardened. Both the heating unit and quenching head straddle the edge of the blade, and the shield 17 is of a dimension that it can pass within the heating unit.

Figure 2:
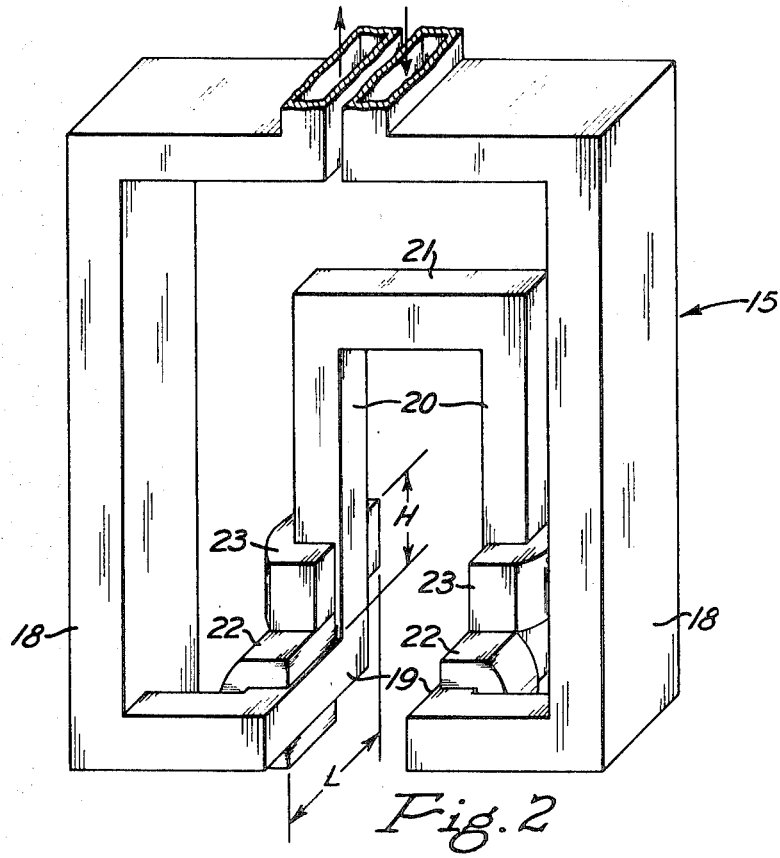
FIG. 2 is a perspective view of the induction-heating unit embodied in our apparatus.

FIG. 2 shows the induction heating unit 15 in more detail. The unit comprises a length of copper tubing 18 of rectangular cross section. We shape the tubing to provide a pair of spaced-apart circumferential legs 19, a pair of spaced-apart radial legs 20 extending at right angles to the respective legs 19, and a transverse leg 21 joining the two legs 20. Legs 19 and 20 carry U-shaped blocks 22 and 23 respectively of nonconducting ferromagnetic material. This material consists of fine magnetic particles embedded in a nonconducting plastic. One example of a suitable material available commercially is "Ferrotron," manufactured by The Polymer Corp., Reading, Pa. Blocks 22 and 23 together are of a length L approximately equal to the tip-to-tip distance between two successive teeth 12 (that is, the pitch of the blade). Blocks 23 and the adjacent legs of blocks 22 together are a height H approximately equal to the height of each tooth. The opposed faces of the blocks are substantially flush with those of the legs of the tubing. We connect the tubing 18 to a source of electric current of appropriate characteristics for heating the edge of blade 10 by induction. Commonly power input is in the range of 50 to 100 kw. and the frequency is on the order of 10,000 cycles per second, but these values vary for blades of different thickness or composition. The blocks 22 and 23 confine the magnetic flux produced by the current and thus localize the heating effect. We pass a stream of water through the tubing to prevent it from overheating.

Figure 3:
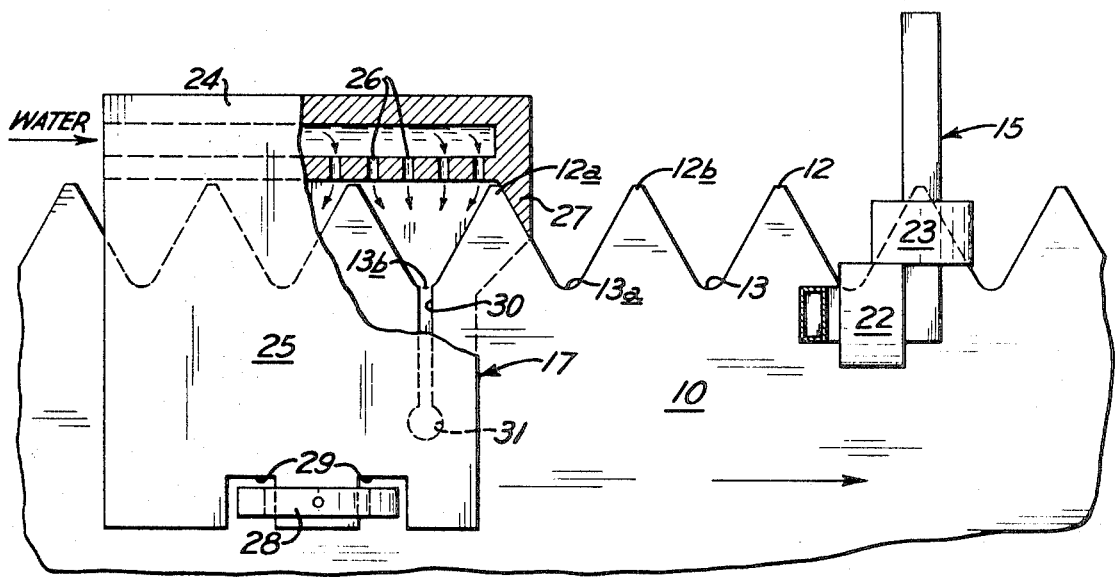
FIG. 3 is a developed side elevational view partly broken away of the shield embodied in our apparatus installed on a blade and showing also the heating unit.

FIG. 3 shows the shield 17 in more detail. The shield includes a manifold 24 and sideplates 25 which depend from the manifold to encompass the sides of the blade. We connect the manifold to a water source. The lower face of the manifold has a plurality of discharge openings 26. The leading end of the manifold has a depending hook 27 which fits over one of the teeth 12a already hardened. We hold the shield in place with suitable clamps, such as the magnets 28 illustrated. These magnets are attached to the shield, and their poles extend through cutouts 29 in the edge of the shield and abut the side of the blade.

In operation, we rotate blade 10, energize the induction heating unit 15, and apply a cooling medium through the quenching head 16, as already described. The heating unit heats the teeth 12 and roots 13 of the blade to a temperature above the austenitizing temperature of the steel. Blocks 22 and 23 confine the portions thus heated to areas under these blocks and under the legs 19 and 20 of the tubing encompassed by the blocks. Cooling medium introduced through the quenching head quenches the heated portions of the blade to provide the proper hardness. The first portions of the blade to pass through the heating unit 15 usually are not fully heated to the austenitizing temperature. Hence we continue rotating the blade until these portions have been heated and quenched a second time. As one of the roots 13a which has been fully heat treated (usually the first) again approaches the heating unit, we attach the shield 17 over the tooth 12a just behind this root. We continue to rotate the blade until root 13a is completely rehardened. We deenergize the heating unit just after root 13a is reheated above the austenitizing temperature. The shield passes through the heating unit and substantially prevents other teeth already hardened from again reaching their austenitizing temperature or being softened by tempering while the last root is being quenched. In this manner we confine any significant loss of hardness to the leading edge of the first tooth 12a beyond the last-hardened root 13a. By heating only a small portion of the blade at a time, we effectively prevent any distortion.

Figure 4:
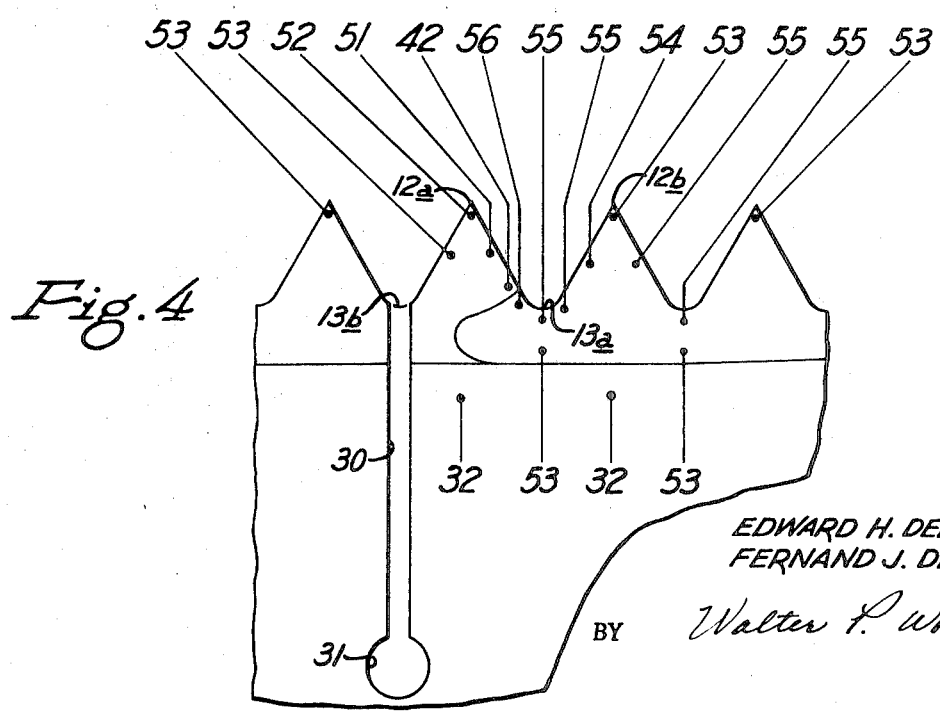
FIG. 4 is a developed side elevational view of the overlapped region of a blade hardened with our apparatus.

As a specific example, we hardened a 72-inch diameter blade of the usual composition at a peripheral speed of 10 inches per minute with an electrical power input of 66 kw. at a frequency of 10,000 cycles per second. We used an air quench. FIG. 4 shows the portion of the blade where we began and ended the hardening operation. Tooth 12b and root 13a are the last to be heated to the austenitizing temperature and quenched. The numerals indicate the Rockwell C hardness at the various points where we took measurements. It is seen there is only one small area on tooth 12a where the hardness is below 50 Rockwell C but still above 40 Rockwell C.

To produce a further improvement in fatigue resistance, we prefer to cut a slot 30 in the root 13b one beyond the last-hardened root 13a. The slot has a minimum depth exceeding the depth of the portion of the blade which is formed into teeth as the blade is resharpened (i.e., the "wear metal") and a maximum depth equal to about one-sixth the radius of the blade. The slot has an enlarged and rounded inner end 31. We may cut the slot in the blade before or after the hardening operation, and we may reharden the blade after we cut the slot. We start the heat treatment several teeth ahead of the slot so that we finish at the root 13a one ahead of the slot.

From the foregoing description it is seen that our invention affords a simple effective apparatus for hardening the teeth and tooth roots of a circular saw blade to forestall fatigue failure. The teeth have the proper hardness for cutting, while the roots are hardened to resist fatigue cracking. We have shown the heating unit positioned to heat each root ahead of the following tooth. We prefer this arrangement since it gives better heat penetration into the body of the blade and narrows the portion which is softened at the end. Nevertheless we can turn the heating unit around and still obtain useful results.

While we have shown and described only a single embodiment of our invention, it is apparent that modifications may arise. Therefore, we do not wish to be limited to the disclosure set forth but only by the scope of the appended claims.

We claim:

1. Apparatus for heat treating the teeth and tooth roots of a circular saw blade comprising:
    means for rotatably supporting the blade;
    a stationary induction heating unit supported adjacent the circumferential edge of the blade for heating a localized portion of the blade including a tooth and an adjacent root to the austenitizing temperature;
    a stationary quenching device supported adjacent the circumferential edge of the blade spaced from said unit; and
    a shielding device placed over the teeth and roots which already have been heated and quenched as these teeth and roots approach said unit on continued rotation of the blade.

2. An apparatus as defined in claim 1 in which said quenching device is spaced a maximum of about one-fifteenth the circumference of the blade from said heating unit.

3. An apparatus as defined in claim 1 in which said heating unit includes:
    a length of copper tubing shaped to provide a pair of spaced-apart circumferential legs, a pair of spaced-apart radial legs extending at right angles to the circumferential legs, and a transverse leg connecting the radial legs; and
    blocks of nonconducting ferromagnetic material mounted on said circumferential and radial legs.

4. An apparatus as defined in claim 1 in which said shielding device includes a water-cooled manifold fitting over the circumferential edge of the blade, sideplates depending from said manifold encompassing the sides of the blade, a hook depending from one end of said manifold and fitting over a tooth, and means carried by said sideplates for attaching the shield to a blade.